(12) United States Patent
Masumitsu

(10) Patent No.: US 12,067,318 B2
(45) Date of Patent: Aug. 20, 2024

(54) COMMUNICATION APPARATUS, CONTROL METHOD, AND STORAGE MEDIUM

(71) Applicant: CANON KABUSHIKI KAISHA, Tokyo (JP)

(72) Inventor: Taishi Masumitsu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/322,463

(22) Filed: May 23, 2023

(65) Prior Publication Data
US 2023/0385003 A1    Nov. 30, 2023

(30) Foreign Application Priority Data

May 26, 2022   (JP) ................................. 2022-086419

(51) Int. Cl.
*G06F 3/12* (2006.01)

(52) U.S. Cl.
CPC ............ *G06F 3/126* (2013.01); *G06F 3/1205* (2013.01); *G06F 3/1236* (2013.01)

(58) Field of Classification Search
CPC . H04L 67/306; H04M 1/72463; H04M 15/41; H04M 15/67; H04M 15/68; H04M 15/70; H04M 15/723; H04M 15/83; H04M 15/852; H04W 4/24; H04W 8/18; H04N 1/6022; H04N 1/60; H04N 1/6002; B41J 2/17566; B41J 2/17506; B41J 2/21; B41J 2/2132; B41J 2002/17569; B41J 2002/17589; G06F 3/1219; G06F 3/1237; G06F 3/1239; G06F 3/1244; G06F 3/1254; G06F 3/1285; G06K 15/1823; G06K 15/4075; G03G 15/0856; G06N 20/00

USPC ......................................................... 358/1.15
See application file for complete search history.

(56) References Cited

U.S. PATENT DOCUMENTS

| | | | | |
|---|---|---|---|---|
| 9,712,664 | B1* | 7/2017 | McMullen | H04M 15/852 |
| 10,133,780 | B2* | 11/2018 | Bardsley | G06F 16/951 |
| 11,586,394 | B2* | 2/2023 | Yamada | G06K 15/402 |
| 11,656,815 | B2* | 5/2023 | Kojima | G06F 3/1255 |
| | | | | 358/1.14 |

(Continued)

FOREIGN PATENT DOCUMENTS

| | | |
|---|---|---|
| JP | 2018056761 A | 4/2018 |
| JP | 2021110775 A | 8/2021 |

*Primary Examiner* — Negussie Worku
(74) *Attorney, Agent, or Firm* — Canon U.S.A., Inc. IP Division

(57) ABSTRACT

A printing apparatus includes a first obtaining unit configured to obtain information about a subscription service related to the printing apparatus, an acceptance unit configured to accept execution of processing of job data, and a first control unit configured to execute the processing of the job data in a case where the obtained information is information indicating that a contract of a first subscription service has been concluded and the processing of the job data accepted by the acceptance unit is processing not involving a print operation, and not execute the processing of the job data in a case where the obtained information is information indicating that a contract of a second subscription service different from the first subscription service has been concluded and the processing of the job data accepted by the acceptance unit is processing not involving the print operation.

20 Claims, 11 Drawing Sheets

(56) References Cited

U.S. PATENT DOCUMENTS

| | | | |
|---|---|---|---|
| 2014/0355029 A1* | 12/2014 | Mccoog | G06K 15/1803 |
| | | | 358/1.14 |
| 2018/0076952 A1 | 3/2018 | Kono | |
| 2021/0306516 A1 | 9/2021 | Yamada | |
| 2021/0326083 A1* | 10/2021 | Hoopes | G06F 3/1239 |
| 2022/0321729 A1* | 10/2022 | Hirose | G06F 3/1204 |
| 2022/0377184 A1* | 11/2022 | Kajiyama | H04N 1/00244 |
| 2022/0383058 A1* | 12/2022 | Shaw | H04N 1/6022 |
| 2023/0019647 A1* | 1/2023 | Yamada | H04N 1/346 |
| 2023/0176801 A1* | 6/2023 | Chin | G06Q 20/145 |
| | | | 358/1.15 |
| 2023/0350619 A1* | 11/2023 | Yabe | G06F 3/121 |
| 2024/0114099 A1* | 4/2024 | Suzuki | H04N 1/00925 |

\* cited by examiner

COMMUNICATION APPARATUS, CONTROL METHOD, AND STORAGE MEDIUM

BACKGROUND OF THE INVENTION

Field of the Invention

The present invention relates to a communication apparatus, a control method, and a storage medium.

Description of the Related Art

Services for using a printing apparatus at a flat rate have been known. For example, Japanese Patent Application Laid-Open No. 2021-110775 discusses a technique in which, in a case of an image forming apparatus unable to communicate with a server that manages contract information, a restriction is put on printing by the image forming apparatus that uses subscription service-specific consumables.

A further improvement of convenience has been desired of the flat rate services for using a printing apparatus.

SUMMARY OF THE INVENTION

According to an aspect of the present invention, a printing apparatus includes a first obtaining unit configured to obtain information about a subscription service related to the printing apparatus, an acceptance unit configured to accept execution of processing of job data, and a first control unit configured to execute the processing of the job data in a case where the information obtained by the first obtaining unit is information indicating that a contract of a first subscription service has been concluded and the processing of the job data accepted by the acceptance unit is processing not involving a print operation, and not execute the processing of the job data in a case where the information obtained by the first obtaining unit is information indicating that a contract of a second subscription service different from the first subscription service has been concluded and the processing of the job data accepted by the acceptance unit is processing not involving the print operation.

Further features of the present invention will become apparent from the following description of exemplary embodiments with reference to the attached drawings.

DESCRIPTION OF THE EMBODIMENTS

Embodiments of the present invention will be described below with reference to the drawings.

Figure 1:
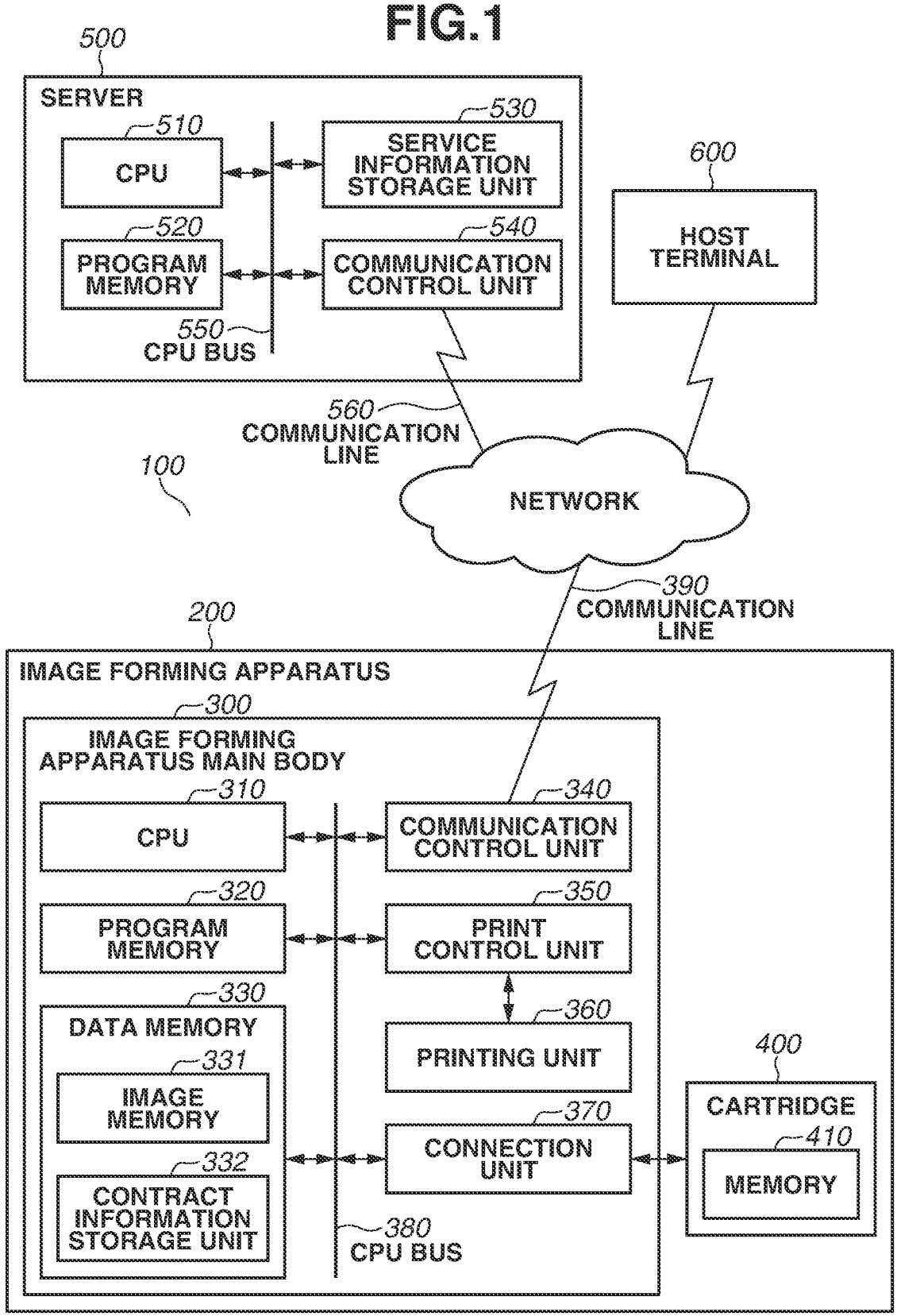
FIG. 1 is a block diagram illustrating an image processing system.

FIG. 1 is a block diagram illustrating a configuration of an image processing system 100 according to a first embodiment of the present invention. The image processing system 100 includes an image forming apparatus 200, a server 500, and a host terminal 600.

The image forming apparatus 200 includes an image forming apparatus main body 300 that performs a print operation using a recording agent, and a cartridge 400 that can be mounted on the image forming apparatus main body 300 to charge ink to be used as the recording agent. The image forming apparatus main body 300 includes a central processing unit (CPU) 310, a program memory 320, a data memory 330, a communication control unit 340, a print control unit 350, a printing unit 360, and a connection unit 370.

The CPU 310 is a system control unit and controls entire operation of the image forming apparatus 200.

The program memory 320 stores a control program and a built-in operating system (OS) program that are executed by the CPU 310.

The data memory 330 includes an image memory 331 and a contract information storage unit 332. The data memory 330 stores program control variables, and includes various work buffer areas that the print control unit 350 uses in processing. The image memory 331 accumulates image data processed by an image processing unit (not illustrated). The contract information storage unit 332 stores subscription service contract information received by the image forming apparatus main body 300 via the communication control unit 340. Subscription services will be described below.

In the present embodiment, the subscription service contract information stored in the contract information storage unit 332 is any one of the following pieces of information: information indicating a subscription service contract unconcluded state in which no subscription service contract is concluded, information indicating a consumable subscription service contract concluded state, and information indicating a main body-included subscription service contract concluded state.

The communication control unit 340 controls data exchange with outside via a communication line 390 and various interfaces.

The print control unit 350 obtains print data from the image memory 331, and controls print processing via the printing unit 360.

The printing unit 360 performs print processing in response to receipt of a print instruction from the print control unit 350. In a case where the contract information stored in the contract information storage unit 332 indicates the consumable subscription service contract concluded state or the main body-included subscription service contract concluded state and a subscription service-specific cartridge is mounted on the image forming apparatus main body 300, the print control unit 350 transmits print information to the server 500. The print information refers to a log in which a job mode, such as a copy job and a print job, the amount of printing, and print results are summarized (hereinafter, referred to as a print record log). The print control unit 350 generates the print information in units of jobs that involve a print operation, and transmits the generated print information to the server 500 via the communication control unit 340. The printing unit 360 determines whether the subscription service-specific cartridge is used, and transmits a result of the determination to the print control unit 350.

Determination of whether a job is a mode of job involving a print operation is performed based on identification information contained in the job data. For example, the identification information indicates whether the job is a print job, a copy job, a scan job, or a facsimile (FAX) transmission job. In a case where the identification information indicates a print job or a copy job, it is determined that the job involves a print operation. In a case where the identification information indicates a scan job or a FAX transmission job, it is determined that the job does not involve a print operation.

The determination of whether the job is a mode of job involving a print operation can be performed based on whether processing of job data instructed to be executed by the user is print processing. In other words, determination can be performed based on whether processing of corresponding job data involves a print operation. For example, in a case where the user presses a print execution button or a copy execution button, it can be determined that processing of the corresponding job data involves a print operation. In a case where the user presses a scan execution button or a FAX transmission execution button, it can be determined that processing of the corresponding job data does not involve a print operation. In the following description, a job involving a print operation thus means that processing of the job data involves a print operation. A job not involving a print operation means that processing of the job data does not involve a print operation.

The connection unit 370 connects the image forming apparatus main body 300 and the cartridge 400. The connection unit 370 reads information about the cartridge 400 from a memory 410, and provides the information about the cartridge 400 in response to an information acquisition request from the printing unit 360.

The foregoing components 310, 320, 330, 340, 350, 360, and 370 are connected to each other via a CPU bus 380 managed by the CPU 310.

The cartridge 400 includes the memory 410. The memory 410 records first cartridge information for identifying the cartridge 400, second cartridge information indicating remaining ink level information, and third cartridge information that is used for determining whether the cartridge 400 is a subscription service-specific cartridge. The first cartridge information is a serial number assigned when the cartridge 400 has been manufactured. The second cartridge information is information about the remaining level of ink in the cartridge 400. The second cartridge information can be expressed in units of volume or in remaining levels graded by predetermined thresholds. The third cartridge information is used for determination of whether the cartridge 400 is a commercially available one (cartridge other than a subscription service-specific cartridge; hereinafter, referred to as a normal cartridge) or a subscription service-specific cartridge. The third cartridge information can have parameters different between the cartridge 400 as a consumable subscription service-specific cartridge and the cartridge 400 as a main body-included subscription service-specific cartridge, or have the same parameter.

The cartridge 400 can be any cartridge that charges the recording agent to be used for printing and is detached from the connection unit 370 for replacement. The cartridge 400 is thus not limited to an ink cartridge but can be a toner cartridge, for example.

The server 500 includes a CPU 510, a program memory 520, a service information storage unit 530, and a communication control unit 540.

The CPU 510 is a system control unit and controls entire operation of the server 500.

The program memory 520 stores a control program, a built-in OS program, and the like that are executed by the CPU 510.

The service information storage unit 530 stores information about the user having a subscription service contract, identification information (such as a serial number) about the image forming apparatus 200 for use in the subscription service, and print information collected from print record logs transmitted from the image forming apparatus 200.

The communication control unit 540 controls data exchange with outside via a communication line 560.

The foregoing components 510 to 540 are connected to each other via a CPU bus 550 managed by the CPU 510.

The host terminal 600 is a communication device (information processing apparatus) capable of connecting to a network and communicating with the server 500. An example of the host terminal 600 is a smartphone.

While, in the present embodiment, the image forming apparatus 200 is described as a printer (printing apparatus), the image forming apparatus 200 can be applied to an inkjet printer, a full-color laser beam (electrophotographic) printer (laser beam printer), and a monochrome printer. While, in the present embodiment, the host terminal 600 is described as a smartphone, this is not restrictive. For example, various devices, such as a mobile terminal, a personal computer, a tablet terminal, a personal digital assistant (PDA), and a digital camera, can be applied as the information processing apparatus.

A description will be given of a consumable subscription service and a main body-included subscription service as the subscription services related to the image forming apparatus 200. The consumable subscription service has been known as a service in which consumables (such as ink, toner, and sheets) for use in printing are available at a flat rate to the user owning the image forming apparatus 200, and the main body-included subscription service has been known as a service in which the image forming apparatus main body 300, which is a service-specific apparatus, and consumables for use in printing are usable at a flat rate by the user. Specifically, the consumable subscription service refers to a service in which the user having a contract for the subscription service can print up to a predetermined number of sheets using an ink cartridge provided by the service provider (hereinafter, a subscription service-specific cartridge) on an image forming apparatus main body 300 purchased (owned) by himself/herself. For example, in a case where the predetermined number of sheets printable per month is 100, printing up to 100 sheets can be performed using the cartridge provided by the service provider with the image forming apparatus 200 in a state in which the image forming apparatus main body 300 and the server 500 are connected to each other. The main body-included subscription service is a service in which up to a predetermined number of sheets can be printed using a cartridge provided by the service provider with the image forming apparatus main body 300 provided by the service provider. For example, in a case where the predetermined number of sheets printable per month is 100, printing up to 100 sheets can be performed using the cartridge provided by the service provider and the image forming apparatus main body 300, which is a service-specific apparatus, in a state in which the image forming apparatus main body 300 and the server 500 are connected to each other. The main body-included subscription service covers the fee of the image forming apparatus main body 300 with its flat rate. After cancellation of the contract for the main body-included subscription service, the user returns the image forming apparatus main body 300 provided by the service provider to the service provider. In a case where the user of such subscription services wants to perform print processing beyond the predetermined number of sheets, the service provider can provide a cartridge with an extra fee. After cancellation of the contract for the subscription services, the user of the subscription services returns the consumables provided by the service provider to the service provider.

In such a subscription service, the information about the image forming apparatus main body 300 under the subscription service contract or the image forming apparatus main body 300 for use in the subscription service is managed by the server 500 of the vendor (service provider) providing the subscription service (server outside the image forming apparatus main body 300). The precondition for the user to use the subscription service is thus that the image forming apparatus 200 is connected to the network to enable communication with the server 500 so that print record information is transmitted to the service provider's server. In other words, a case where the image forming apparatus 200 is in the subscription service contract concluded state refers to a state where the image forming apparatus 200 can communicate with the server 500. In the present embodiment, an offline state refers to a state where the image forming apparatus 200 is not connected to the server 500. An online state refers to a state where the image forming apparatus 200 is connected to the server 500.

While the network connection of the image forming apparatus 200 to establish the connection with the server 500 is the precondition for the user to use the subscription services, the user can sometimes be unable to connect the image forming apparatus 200 to the network because of the service provider (for example, due to a server outage). For such a reason, there is provided a function of enabling job printing up to a certain number of sheets even without the network connection of the image forming apparatus 200. The number of sheets printed using a subscription-specific cartridge with the image forming apparatus 200 being offline will be referred to as a number of sheets printed offline. The foregoing certain number of sheets is the upper limit of the number of sheets printed offline (hereinafter, an upper limit number of offline printable sheets). The number of sheets printed offline is a value recorded in the data memory 330 and has an initial value of zero (0). Achieving a service use condition (when the service use condition is achieved) thus refers to a case where the upper limit number of offline printable sheets is not exceeded. Not achieving the service use condition (when the service use condition is unachieved) refers to a case where the upper limit number of offline printable sheets is exceeded. In a case where the service use condition is unachieved, the use of the subscription service-specific apparatus, i.e., the image forming apparatus 200, and/or consumables is typically restricted. For example, in a case where the contract information about the subscription service indicates the consumable subscription service when the service use condition is unachieved, the use of the subscription service-specific cartridge is restricted in executing a job involving printing. The use of a normal cartridge in executing a job involving printing is not restricted. Execution of a job not involving printing is not restricted, either. In other words, in the consumable subscription service, a restriction is limitedly put on execution of a job using the subscription service-specific cartridge covered by the service because the image forming apparatus main body 300 is purchased by the user. Specifically, restrictions are not put on execution of a print job using the normal cartridge not covered by the service and execution of a job using a scan function (operation) or a FAX function (operation) not involving printing. In a case where, for example, the contract information about the subscription service indicates the main body-included subscription service when the service use condition is unachieved, execution of jobs involving printing (execution of a job using the subscription service-specific cartridge and execution of a job using the normal cartridge) and execution of jobs not involving printing are both restricted. This is because the main body-included subscription service covers the image forming apparatus main body 300 as well as the consumables, and thus restrictions are put on execution of all jobs covered by the service. Specifically, restrictions are put on execution of print jobs and execution of jobs using the scan function or the FAX function not involving printing. In the present embodiment, the execution of jobs in the subscription service contract unconcluded state where no contract of any of the subscription services is concluded is restricted as in the case where the contract information about the subscription service indicates the consumable subscription service when the service use control is unachieved.

In the present embodiment, the subscription service contract unconcluded state where no contract of any of the subscription services is concluded refers to a state where the user has purchased the image forming apparatus 200 and not have the consumable subscription service contract. Another case is where the user has the consumable subscription service contract but has not performed the processing for enabling communication between the image forming apparatus 200 and the server 500. Yet another case is where the user has the main body-included subscription service contract but has not performed processing for enabling communication between the image forming apparatus 200, which is a delivered subscription service-specific apparatus, and the server 500. In such cases, a restriction is put on the use of the subscription service-specific cartridge in executing a job involving printing. A restriction is not put on the use of a normal cartridge in executing a job involving printing. Further, a restriction is not put on execution of a job not involving printing, either. Concluding a subscription service contract is processing in which the user concludes a contract for the subscription service using the host terminal 600, and the processing corresponds to steps S201 to S203 of FIG. 2 to be described below.

In the present embodiment, when the subscription service use condition is achieved, jobs involving printing (jobs using the subscription service-specific cartridge or jobs using the normal cartridge) and jobs not involving printing are both executed regardless of whether the subscription service is the consumable subscription service or the main body-included subscription service. In a case where the service is the main body-included subscription service and when the service use condition is achieved, permission can be limitedly given to the use of the subscription service-specific cartridge. Alternatively, permission can be given to both of the use of the normal cartridge and the user of the subscription service-specific cartridge.

Figure 2:
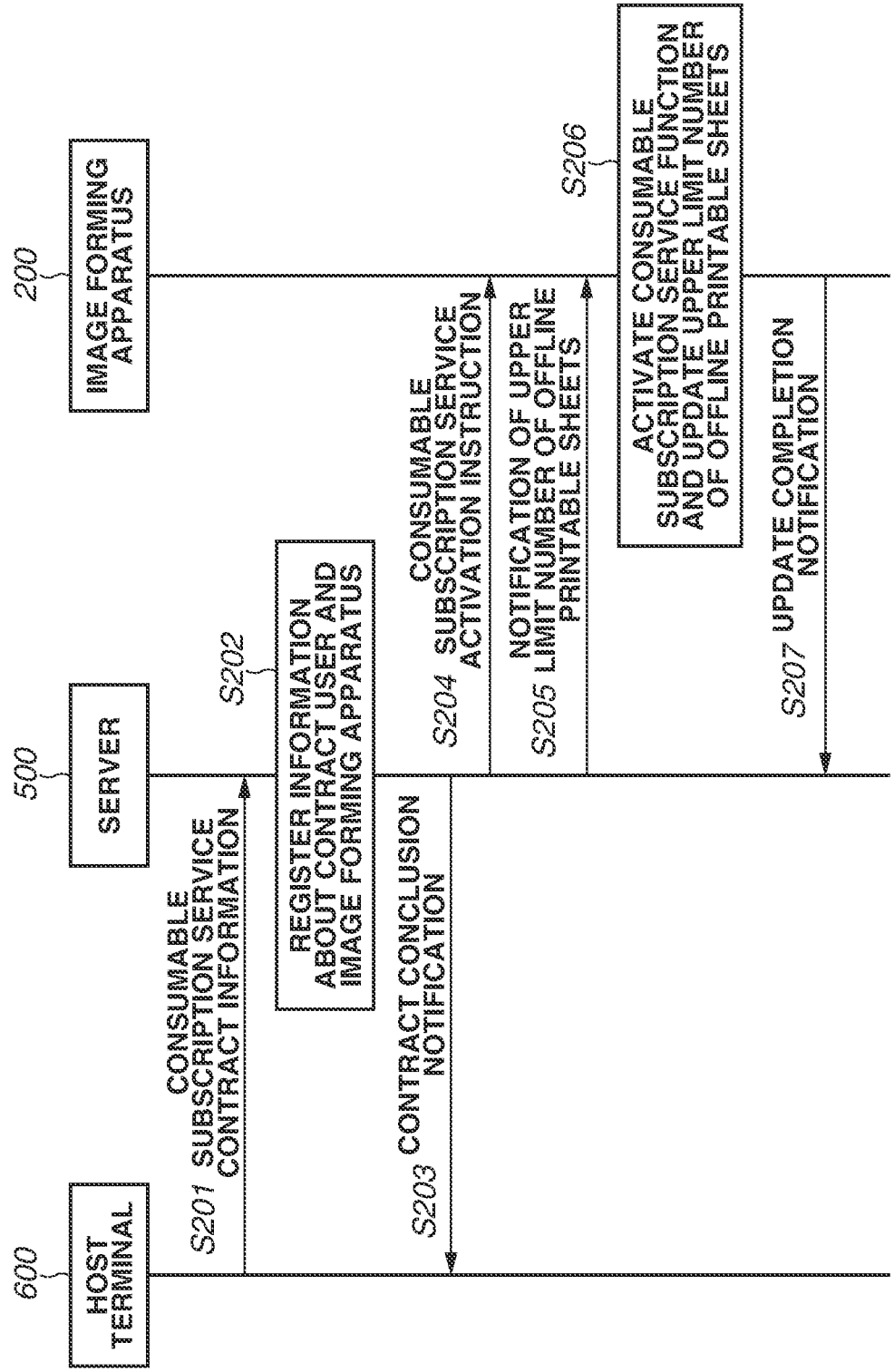
FIG. 2 is a sequence diagram illustrating processing for concluding a consumable subscription service contract.

FIG. 2 is a sequence diagram in concluding a consumable subscription service contract.

In step S201, the host terminal 600 transmits consumable subscription service contract information to the server 500. The consumable subscription service contract information includes user information, identification information about the image forming apparatus 200 for use in the subscription service, and information about the subscription plan to make the contract for.

In step S202, the server 500 registers (stores) information about the contract user and the image forming apparatus 200 in the service information storage unit 530 based on the contract information.

In step S203, the server 500 returns a contract conclusion notification to the host terminal 600.

After the conclusion of the contract, in step S204, the server 500 transmits a consumable subscription service activation instruction to the image forming apparatus 200.

In step S205, the server 500 transmits a notification of the upper limit number of offline printable sheets to the image forming apparatus 200.

In step S206, the image forming apparatus 200 activates a consumable subscription service function and updates the upper limit number of offline printable sheets in response to steps S204 and S205. The activation of the consumable subscription service function by the image forming apparatus 200 will be described below with reference to FIG. 3. The upper limit number of offline printable sheets is a value stored in the data memory 330. In step S206, the image forming apparatus 200 updates the upper limit number of offline printable sheets with a notified parameter. After activation of the consumable subscription service function, the image forming apparatus 200 can perform print processing covered by the consumable subscription service by mounting the consumable subscription service-specific cartridge 400 on the image forming apparatus 200.

In step S207, the image forming apparatus 200 returns an update completion notification to the server 500.

A sequence diagram for conclusion of a main body-included subscription service contract is similar to the foregoing. In a case of conclusion of the main body-included subscription service contract, the user concludes a contract for the main body-included subscription service using the host terminal 600 in step S201. After the contract conclusion notification received in step S203, the user can receive the image forming apparatus main body 300 (for example, the image forming apparatus main body 300 is delivered) from the service provider.

Figure 3:
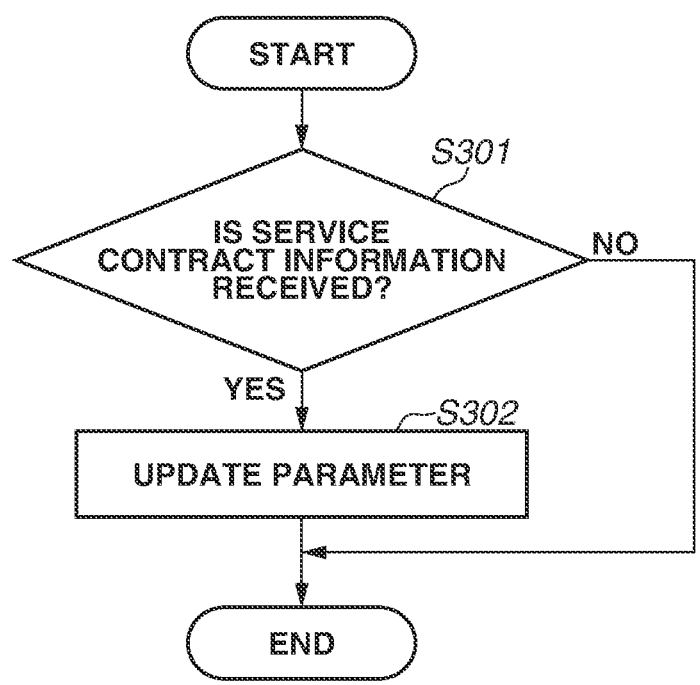
FIG. 3 is a flowchart of processing for activating a subscription service function.

Next, the processing that is performed by the image forming apparatus 200 to activate the subscription service function in step S206 of FIG. 2 will be described with reference to FIG. 3.

In step S301, the image forming apparatus 200 performs service contract information reception determination processing. Specifically, the image forming apparatus 200 determines whether the service contract information is received via the communication control unit 340. In step S301, in a case where the image forming apparatus 200 has not received the service contract information (NO in step S301), the processing of this flowchart ends. In a case where the image forming apparatus 200 has received the service contract information (YES in step S301), the processing proceeds to step S302.

In step S302, the image forming apparatus 200 updates the parameter stored in the contract information storage unit 332 with the parameter of the received service contract information. For example, in a case where information indicating the consumable subscription service contract concluded state is received, the image forming apparatus 200 changes the parameter to the parameter indicating the consumable subscription service contract concluded state. In the first embodiment of the present invention, the image forming apparatus 200 directly receives the service contract information from the server 500. Alternatively, the image forming apparatus 200 can receive the service contract information via the host terminal 600. In such a case, the host terminal 600 receives the service contract information from the server 500, and the image forming apparatus 200 receives the service contract information via software or an application of the host terminal 600.

Figure 4:
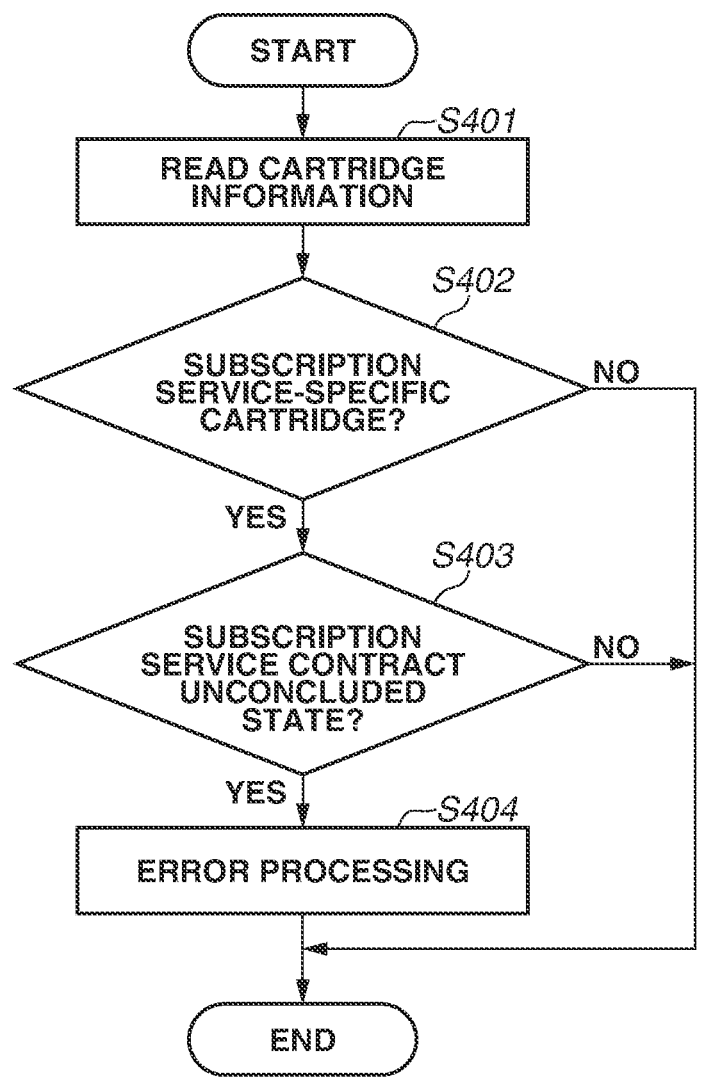
FIG. 4 is a flowchart of processing for cartridge mountability determination processing.

Next, mountability determination processing that is performed by the image forming apparatus 200 on the cartridge 400 mounted on the image forming apparatus 200 will be described with reference to FIG. 4. The image forming apparatus 200 performs the mountability determination processing on the cartridge 400 via the connection unit 370 at a given timing. Examples of the given timing include the timing of when the user performs processing for mounting the cartridge 400 on the image forming apparatus 200, and the timing of when the image forming apparatus 200 receives the service contract information via the communication control unit 340.

In step S401, the image forming apparatus 200 reads the first to third cartridge information from the memory 410 of the cartridge 400 via the connection unit 370.

In step S402, the image forming apparatus 200 determines whether the cartridge 400 is a subscription service-specific cartridge, based on the third cartridge information. In a case where the image forming apparatus 200 determines that the cartridge 400 is not a subscription service-specific cartridge (NO in step S402), the processing of this flowchart ends. In a case where the image forming apparatus 200 determines that the cartridge 400 is a subscription service-specific cartridge (YES in step S402), the processing proceeds to step S403.

In step S403, the image forming apparatus 200 determines whether the contract information stored in the contract information storage unit 332 indicates the subscription service contract unconcluded state. In a case where, in step S403, the image forming apparatus 200 determines that the contract information stored in the contract information storage unit 332 does not indicate the subscription service contract unconcluded state (i.e., indicates the consumable subscription service contract concluded state or the main body-included subscription service contract concluded state; NO in step S403), the processing of this flowchart ends. In a case where, in step S403, the image forming apparatus 200 determines that the contract information stored in the contract information storage unit 332 indicates the subscription service contract unconcluded state (YES in step S403), the processing proceeds to step S404.

In step S404, the image forming apparatus 200 performs error processing. An example of the error processing in step S404 is processing for putting restrictions on operations other than detachment of the cartridge 400. This processing is for a case where the subscription service-specific cartridge is mounted despite the state that no contract of any of the subscription services is concluded. Examples include a case where the image forming apparatus main body 300 does not have any contract after cancellation of a subscription service, and the user has not returned the subscription service-specific cartridge to the service provider yet and the subscription service-specific cartridge is still mounted on the image forming apparatus main body 300.

In a case where a plurality of cartridges 400 is mounted on the image forming apparatus 200, the foregoing processing is performed on all the cartridges 400 mounted. While, in the mountability determination processing, the third cartridge information about the consumable subscription service-specific cartridge 400 and the third cartridge information about the main body-included subscription service-specific cartridge 400 are described to contain the same parameter, the pieces of third cartridge information can contain different parameters. In such a case, the image forming apparatus 200 determines, in the mountability determination processing, whether the third cartridge information and the contract information stored in the contract information storage unit 332 properly correspond to each other.

As described above, the jobs of the image forming apparatus 200 to be restricted when the service use condition is unachieved are different between the consumable subscription service and the main body-included subscription service. In the consumable subscription service, the restrictions are limitedly put on print jobs using the service-specific consumable when the service use condition is unachieved. By contrast, in the main body-included subscription service, since the image forming apparatus main body 300 used in the main body-included subscription service is also specific to the service, the restrictions are put on the use of some of the main body functions of the image forming apparatus 200 as described above. For example, restrictions are put on not only jobs involving a print operation, like a print job, but also jobs not involving a print operation, like a scan job and a FAX reception job.

Since conventional image forming apparatuses are separately manufactured as consumable subscription service-specific apparatuses and main body-included subscription service-specific apparatuses, the subscription services have been unable to be switched on a single image forming apparatus.

In other words, the user has been unable to use a single image forming apparatus for the main body-included subscription service and then the consumable subscription service in a switched manner.

For example, some users may want to purchase a subscription service-specific image forming apparatus lent under the main body-included subscription service contract from the service vendor as their own possession after the expiration of the contract period. Such users may then desire a consumable subscription service contract after the purchase of the image forming apparatus.

Meanwhile, the service provider manufacturing the image forming apparatuses separately produce consumable subscription service-specific image forming apparatuses and main body-included subscription service-specific image forming apparatuses, which can take a lot of labor and cost.

The image forming apparatus 200 according to the present embodiment switches processing based on the information indicating which service contract has been concluded. Specifically, the image forming apparatus 200 puts different restrictions on job execution based on the information indicating whether the contract mode refers to the consumable subscription service, the main body-included subscription service, or the subscription service contract unconcluded state. With this configuration, on an image forming apparatus 200, different job execution restrictions can be put in accordance with the subscription service contract unconcluded state, the consumable subscription service contract concluded state, and the main body-included subscription service contract concluded state.

This enables the user to switch between the main body-included subscription service and then the consumable subscription service with an image forming apparatus 200, and switch between the consumable subscription service and then the main body-included subscription service with an image forming apparatus 200.

Moreover, the service provider manufacturing the image forming apparatuses 200 does not need to separately produce consumable subscription service-specific image forming apparatuses 200 and main body-included subscription service-specific image forming apparatuses 200, whereby labor and cost can be reduced.

Figure 5:
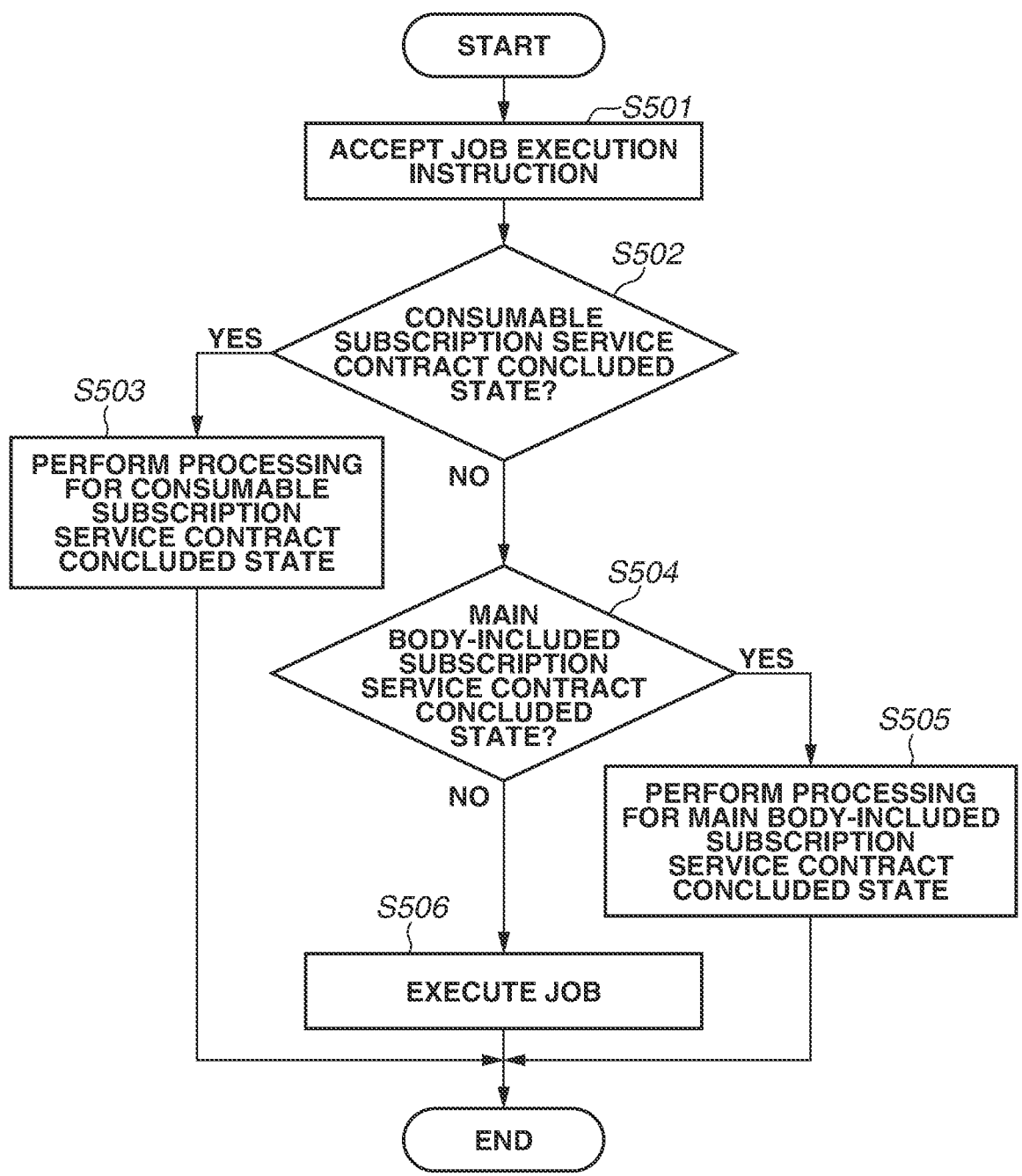
FIG. 5 is a flowchart of processing for job execution processing.

FIG. 5 is a flowchart of job execution processing that is performed by the image forming apparatus 200.

In step S501, the image forming apparatus 200 accepts a job execution instruction from the user by using a certain method. In a case of a print execution instruction, for example, the image forming apparatus 200 accepts the pressing of a print start button.

In step S502, the image forming apparatus 200 determines whether the contract information stored in the contract information storage unit 332 indicates the consumable subscription service contract concluded state. In a case where, in step S502, the image forming apparatus 200 determines that the contract information indicates the consumable subscription service contract concluded state (YES in step S502), the processing proceeds to step S503. In a case where the image forming apparatus 200 determines that the contract information does not indicate the consumable subscription service contract concluded state (NO in step S502), the processing proceeds to step S504.

In step S503, the image forming apparatus 200 performs processing for the consumable subscription service contract concluded state to be described below with reference to FIG. 6.

In step S504, the image forming apparatus 200 determines whether the contract information stored in the contract information storage unit 332 indicates the main body-included subscription service contract concluded state. In a case where, in step S504, the image forming apparatus 200 determines that the contract information indicates the main body-included subscription service contract concluded state (YES in step S504), the processing proceeds to step S505. In a case where the image forming apparatus 200 determines that the contract information does not indicate the main body-included subscription service contract concluded state (i.e., the contract information stored in the contract information storage unit 332 indicates the subscription service contract unconcluded state; NO in step S504), the processing proceeds to step S506.

In step S505, the image forming apparatus 200 performs processing for the main body-included subscription service contract concluded state to be described below with reference to FIG. 7.

In step S506, the image forming apparatus 200 executes the execution-instructed job. As illustrated in FIG. 4, the image forming apparatus 200 is unable to execute a job in the subscription service contract unconcluded state with the subscription service-specific cartridge mounted on the image forming apparatus 200. Jobs to be executed in step S506 are thus limited to jobs using a normal cartridge other than the subscription service-specific cartridge or with the normal cartridge mounted.

Figure 6:
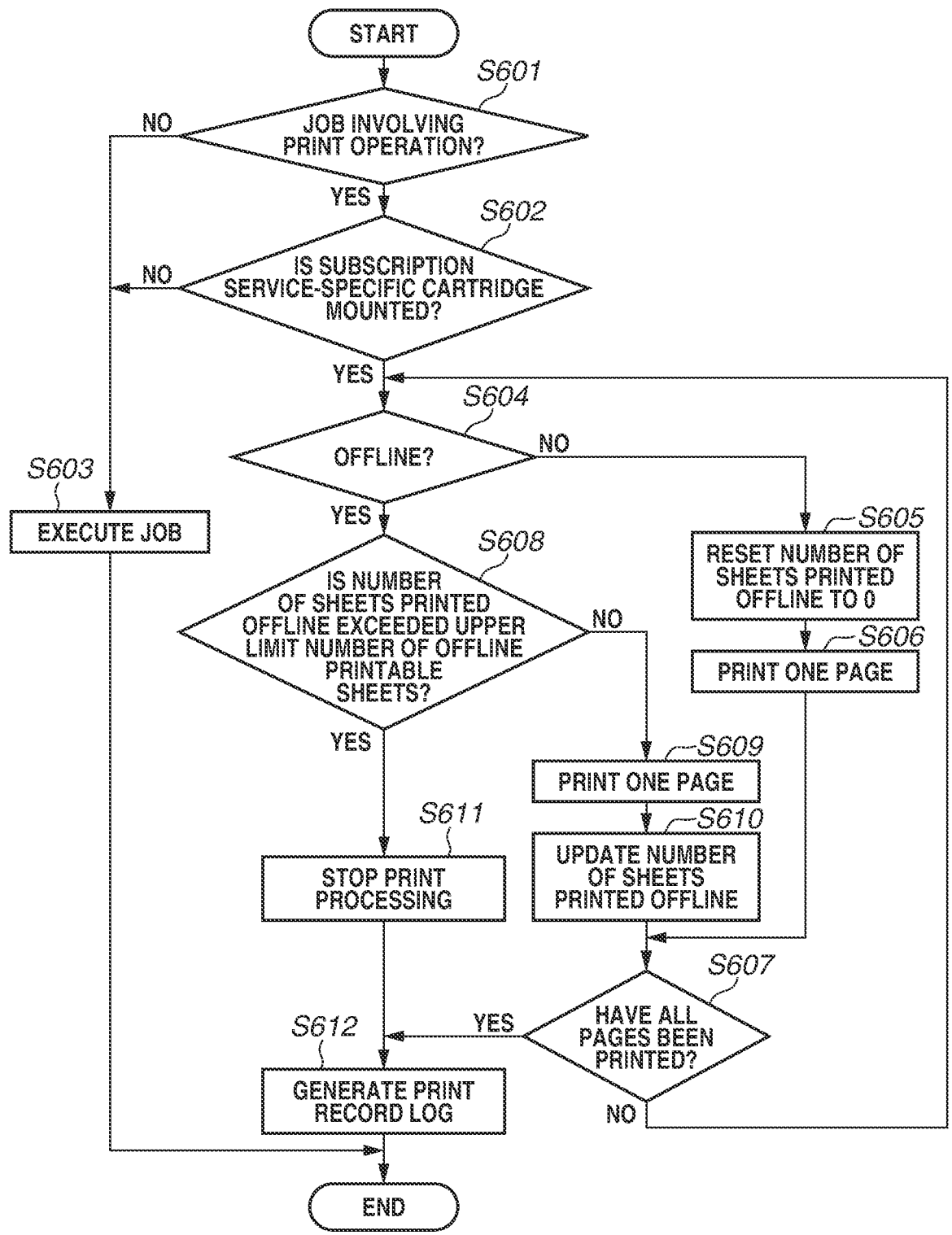
FIG. 6 is a flowchart illustrating job execution processing in a consumable subscription service contract concluded state.

FIG. 6 is a flowchart related to job execution in the case where the image forming apparatus 200 is in the consumable subscription service contract concluded state. Details of the processing in step S503 of FIG. 5 will be described with reference to FIG. 6.

In step S601, the image forming apparatus 200 determines whether the execution-instructed job is a job involving a print operation. In a case where, in step S601, the image forming apparatus 200 determines that the execution-instructed job is a job involving a print operation (YES in step S601), the processing proceeds to step S602. In a case where the image forming apparatus 200 determines that the execution-instructed job is not a job involving a print operation (NO in step S601), the processing proceeds to step S603.

In step S602, the image forming apparatus 200 determines whether a subscription service-specific cartridge is mounted on the image forming apparatus 200, based on the third cartridge information. A plurality of cartridges 400 can be mounted on the image forming apparatus 200. In such a case, the image forming apparatus 200 determines that a subscription service-specific cartridge is mounted in a case where one or more of the cartridges 400 is/are a subscription service-specific cartridge(s). In a case where, in step S602, the image forming apparatus 200 determines that a subscription service-specific cartridge is not mounted (NO in step S602), the processing proceeds to step S603. In a case where the image forming apparatus 200 determines that a subscription service-specific cartridge is mounted (YES in step S602), the processing proceeds to step S604.

In step S603, the image forming apparatus 200 executes the job. The processing of this flowchart ends.

In step S604, the image forming apparatus 200 determines whether the image forming apparatus 200 is offline. Specifically, the communication control unit 340 performs the determination based on information indicating whether the image forming apparatus 200 is offline. In a case where, in step S604, the image forming apparatus 200 determines that the image forming apparatus 200 is online (NO in step S604), the processing proceeds to step S605. In a case where the image forming apparatus 200 determines that the image forming apparatus 200 is offline (YES in step S604), the processing proceeds to step S608.

In step S605, the image forming apparatus 200 resets the recorded number of sheets printed offline to zero (0). As described above, the number of sheets printed offline refers to the number of sheets printed using the subscription service-specific cartridge with the image forming apparatus 200 being offline. The number of sheets printed offline is a value recorded in the data memory 330 and has an initial value of zero (0).

In step S606, the image forming apparatus 200 prints one of the pages of the job.

In step S607, the image forming apparatus 200 determines whether all the pages specified by the job have been printed. In a case where, in step S607, the image forming apparatus 200 determines that all the pages have not been printed (NO in step S607), the processing returns to step S604. In a case where, in step S607, the image forming apparatus 200 determines that all the pages have been printed (YES in step S607), the processing proceeds to step S612.

In step S608, the image forming apparatus 200 determines whether the number of sheets printed offline exceeds the upper limit number of offline printable sheets. Specifically, the image forming apparatus 200 compares the information indicating the upper limit number of offline printable sheets obtained in step S205 of FIG. 2 with the information indicating the number of sheets printed offline. In a case where, in step S608, the image forming apparatus 200 determines that the number of sheets printed offline does not exceed the upper limit number of offline printable sheets (NO in step S608), the processing proceeds to step S609. In a case where the image forming apparatus 200 determines that the number of sheets printed offline exceeds the upper limit number of offline printable sheets (YES in step S608), the processing proceeds to step S611.

In step S609, the image forming apparatus 200 prints one of the pages of the job.

In step S610, the image forming apparatus 200 increments the number of pages printed offline by one (1). The processing proceeds to step S607.

In step S611, the image forming apparatus 200 stops (aborts) the print processing. Here, the image forming apparatus 200 can issue an error notification to the user depending on the configuration of the image forming apparatus 200. For example, an error notification can be displayed on a display unit (not illustrated) of the image forming apparatus 200.

In step S612, the image forming apparatus 200 generates a print record log. The image forming apparatus 200 transmits the generated print record log to the server 500 via the communication control unit 340 at the timing of step S612 or at timing of when the image forming apparatus 200 is online and its operation will not be affected. In transmitting the print record log at the timing of when the image forming apparatus 200 is online and its operation will not be affected, the image forming apparatus 200 resets the number of sheets printed offline after the transmission of the print record log. In a case where the print record log is not transmitted at the timing of step S612, the image forming apparatus 200 stores the print record log in the data memory 330.

The reason why the image forming apparatus 200 generates the print record log and transmits the generated print record log to the server 500 is for the service provider to find out the amount of printing in the subscription service. The image forming apparatus 200 thus can perform additional processing that is for not generating a print record log and is for preventing printed sheets from being counted in the subscription service when printing is performed during a job involving a print operation not because of the user but, for example, for the sake of a maintenance print for nozzle check. In a case where the print processing is stopped in step S611 without printing a page in step S604 or S608, the image forming apparatus 200 does not need to generate a print recording log in step S612. In other words, in this flowchart, step S612 can sometimes be omitted.

Figure 7:
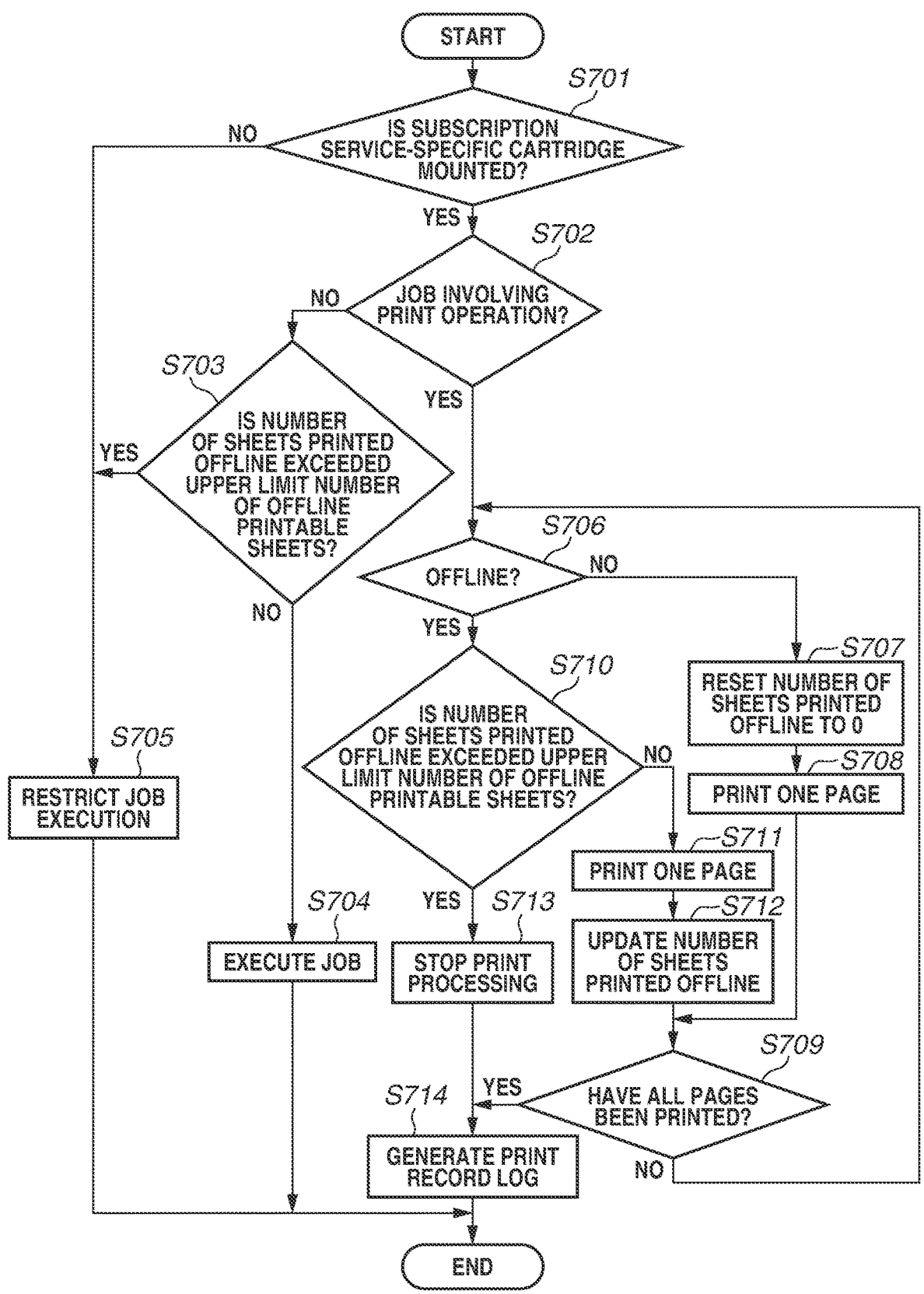
FIG. 7 is a flowchart illustrating job execution processing in a main body-included subscription service contract concluded state.

FIG. 7 is a flowchart related to job execution in the case where the image forming apparatus 200 is in the main body-included subscription service contract concluded state. Details of the processing in step S505 of FIG. 5 will be described with reference to FIG. 7. Here, differences from the flowchart illustrated in FIG. 6 will mainly be described and the redundant descriptions will be omitted.

In step S701, the image forming apparatus 200 determines whether a subscription service-specific cartridge is mounted on the image forming apparatus 200. Like step S602, a plurality of cartridges 400 can be mounted on the image forming apparatus 200. In such a case, the image forming apparatus 200 determines that a subscription service-specific cartridge is mounted in a case where one or more of the cartridges 400 is/are a subscription service-specific cartridge(s). In a case where, in step S701, the image forming apparatus 200 determines that a subscription service-specific cartridge is mounted (YES in step S701), the processing proceeds to step S702. In a case where the image forming apparatus 200 determines that a subscription service-specific cartridge is not mounted (NO in step S701), the processing proceeds to step S705.

In step S702, the image forming apparatus 200 determines whether the execution-instructed job is a job involving a print operation. In a case where, in step S702, the image forming apparatus 200 determines that the execution-instructed job is not a job involving a print operation (NO in step S702), the processing proceeds to step S703. In a case where the image forming apparatus 200 determines that the execution-instructed job is a job involving a print operation (YES in step S702), the processing proceeds to step S706.

In step S703, the image forming apparatus 200 determines whether the number of sheets printed offline exceeds the upper limit number of offline printable sheets. In a case where, in step S703, the image forming apparatus 200 determines that the number of sheets printed offline does not exceed the upper limit number of offline printable sheets (NO in step S703), the processing proceeds to step S704. In a case where the image forming apparatus 200 determines that the number of sheets printed offline exceeds the upper limit number of offline printable sheets (YES in step S703), the processing proceeds to step S705.

In step S704, the image forming apparatus 200 executes the job. The processing of this flowchart ends. In step S705, the image forming apparatus 200 restricts job execution. In this processing, the image forming apparatus 200 can issue an error notification to the user depending on the configuration of the image forming apparatus 200. For example, an error notification can be displayed on the display unit (not illustrated) of the image forming apparatus 200. The processing of steps S706 to S714 is similar to that of steps S604 to S612 in the flowchart of FIG. 6, and thus the descriptions will be omitted.

In the main body-included subscription service, when the service use condition is achieved, permission can be limitedly given to the use of the subscription service-specific cartridge, or permission can be given to the use of both the service service-specific cartridge and the normal cartridge. The foregoing flowchart has dealt with the case where permission is limitedly given to the use of the subscription service-specific cartridge. In a case where permission is also given to the use of the normal cartridge and the determination of step S701 is NO, the processing can proceed to step S703. In other words, the job can be executed unless the upper limit of the number of sheets printed offline is exceeded.

As described above, when the service use condition is unachieved, the image forming apparatus 200 switches processing based on the information about which service is contracted. Specifically, the image forming apparatus 200 imposes different job execution restrictions, based on the information indicating whether the state of the contract is the subscription service contract unconcluded state, the consumable subscription service contract concluded state, or the main body-included subscription service contract concluded state. This enables an image forming apparatus 200 to support various job execution restrictions in accordance with the subscription service contract unconcluded state, the consumable subscription service contract concluded state, and the main body-included subscription service contract concluded state.

The determination of whether the image forming apparatus 200 is offline and the determination of whether the number of sheets printed offline exceeds the upper limit number, which correspond to the processing of steps S604 to S611 in FIG. 6 and the processing of steps S706 to 713 in FIG. 7, respectively, are performed on each of the pages of the job. However, such determinations can be performed job by job.

As described above, when a main body-included subscription service contract is concluded, the user applies for the main body-included subscription service contract using the host terminal 600, and receives the contract concluded notification. The user can then receive the image forming apparatus main body 300 from the service provider (for example, the image forming apparatus main body 300 is delivered from the service provider to the user). The user then completes the connection processing between the server 500 and the image forming apparatus 200.

In the first embodiment, the subscription service contract unconcluded state in which neither of the subscription service contracts is concluded refers to a state in which the user has purchased the image forming apparatus 200 and does not have a consumable subscription service contract. Another case is that the user has the consumable subscription service contract but has not performed the processing for enabling communication between the image forming apparatus 200 and the server 500. Yet another case is that the user has the main body-included subscription service contract but has not performed the processing for enabling communication between the image forming apparatus 200, which has been delivered as a subscription service-specific apparatus, and the server 500. In such cases, restrictions are not put on the use of the subscription service-specific cartridge during execution of a job involving printing, the use of the normal cartridge during execution of a job involving printing, and the execution of a job not involving printing.

By contrast, in a second embodiment, an image forming apparatus 200 is considered to be in the subscription service contract unconcluded state (referred to as a second subscription service contract unconcluded state) in a case where the user has the main body-included subscription service contract but has not performed the processing for enabling communication between the image forming apparatus 200 and a server 500. In other words, information stored in a contract information storage unit 332 also includes information indicating the subscription service contract unconcluded state. In the second subscription service contract unconcluded state, a restriction is also put on execution of jobs other than jobs using the subscription service-specific cartridge. Specifically, restrictions are put on execution of jobs involving printing (execution of a job using the subscription service-specific cartridge and that of a job using the normal cartridge) and execution of jobs not involving printing. This can reduce execution of job data in the case where the user has the main body-included subscription service contract but has not connected the image forming apparatus 200 to the server 500. The processing according to the present embodiment is intended to restrict execution of the print processing using the subscription service-specific cartridge and processing of jobs not involving printing as well since the use of the image forming apparatus 200 by the user is one of the services covered by the main body-included subscription service.

The present embodiment deals with a mode where the image forming apparatus 200 stores ownership information about an image forming apparatus main body 300 and imposes job execution restrictions in accordance with the concluded subscription service contract based on the ownership information and the subscription service contract information. The ownership information is information indicating which of the user and the service provider has the ownership of the image forming apparatus main body 300. The initial value of the ownership information is the user. In a case where the information indicating that the user has the ownership is stored, the image forming apparatus 200 is in the consumable subscription service contract concluded state or the image forming apparatus 200 purchased by the user has not connected to the server 500. In a case where the information indicating that the service provider has the ownership is stored, the image forming apparatus 200 is in the main body-included subscription service contract concluded state or the image forming apparatus 200 is in the second subscription service contract unconcluded state. Since the initial value of the ownership information is the user, the service provider updates the ownership information about the image forming apparatus main body 300 to be lent to the user to the service provider in advance by using a dedicated personal computer (PC) tool when the main body-included subscription service contract is concluded, for example.

This enables appropriate job execution restrictions based on the fact that the subscription service contracted state is the second subscription service contract unconcluded state. In the present embodiment, differences from the first embodiment will mainly be described. Configurations not mentioned are similar to those of the first embodiment, and thus the redundant descriptions will be omitted.

Figure 8:
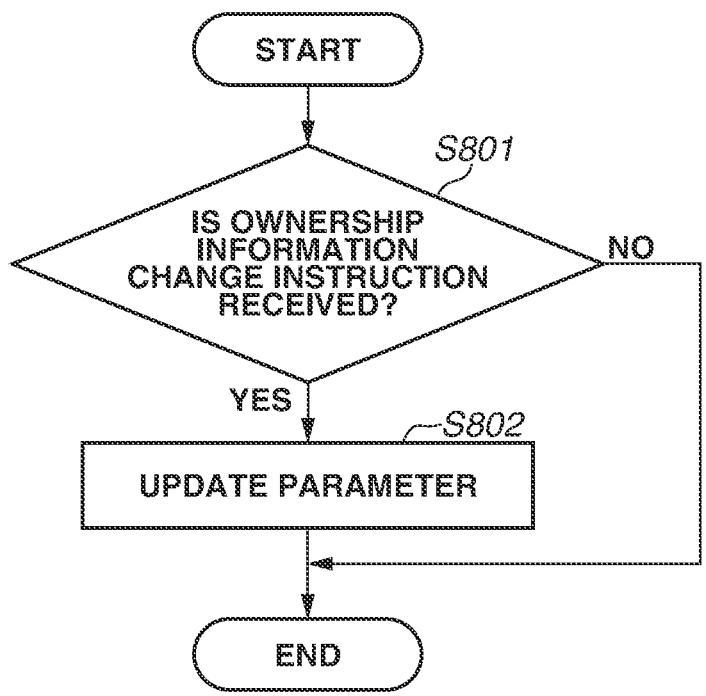
FIG. 8 is a flowchart of processing for updating ownership information about an image forming apparatus main body.

Processing that is performed by the image forming apparatus 200 to update the ownership information about the image forming apparatus main body 300 will be described with reference to FIG. 8.

In step S801, the image forming apparatus 200 performs change determination processing on the ownership information about the image forming apparatus main body 300. Specifically, the image forming apparatus 200 determines whether an ownership information change instruction is received via the communication control unit 340. In a case where, in step S801, the image forming apparatus 200 determines that the image forming apparatus 200 has not received the ownership information change instruction (NO in step S801), the processing of this flowchart ends. In a case where the image forming apparatus 200 determines that the image forming apparatus 200 has received the ownership information change instruction (YES in step S801), the processing proceeds to step S802.

In step S802, the image forming apparatus 200 updates the parameter stored in the data memory 330 with the parameter of the received ownership information. In the second embodiment of the present invention, the image forming apparatus 200 receives the ownership information change instruction from the dedicated PC tool as described above. However, the image forming apparatus 200 can receive the ownership information change instruction from the server 500, in consideration of a case where the user purchases the image forming apparatus main body 300 that is subscription service-specific and has been lent under the main body-included subscription service contract after the expiration of the contract period. In such a case, the host terminal 600 can receive the ownership information change instruction from the server 500, and the image forming apparatus 200 can receive the ownership information change instruction via software or an application of the host terminal 600.

Figure 9:
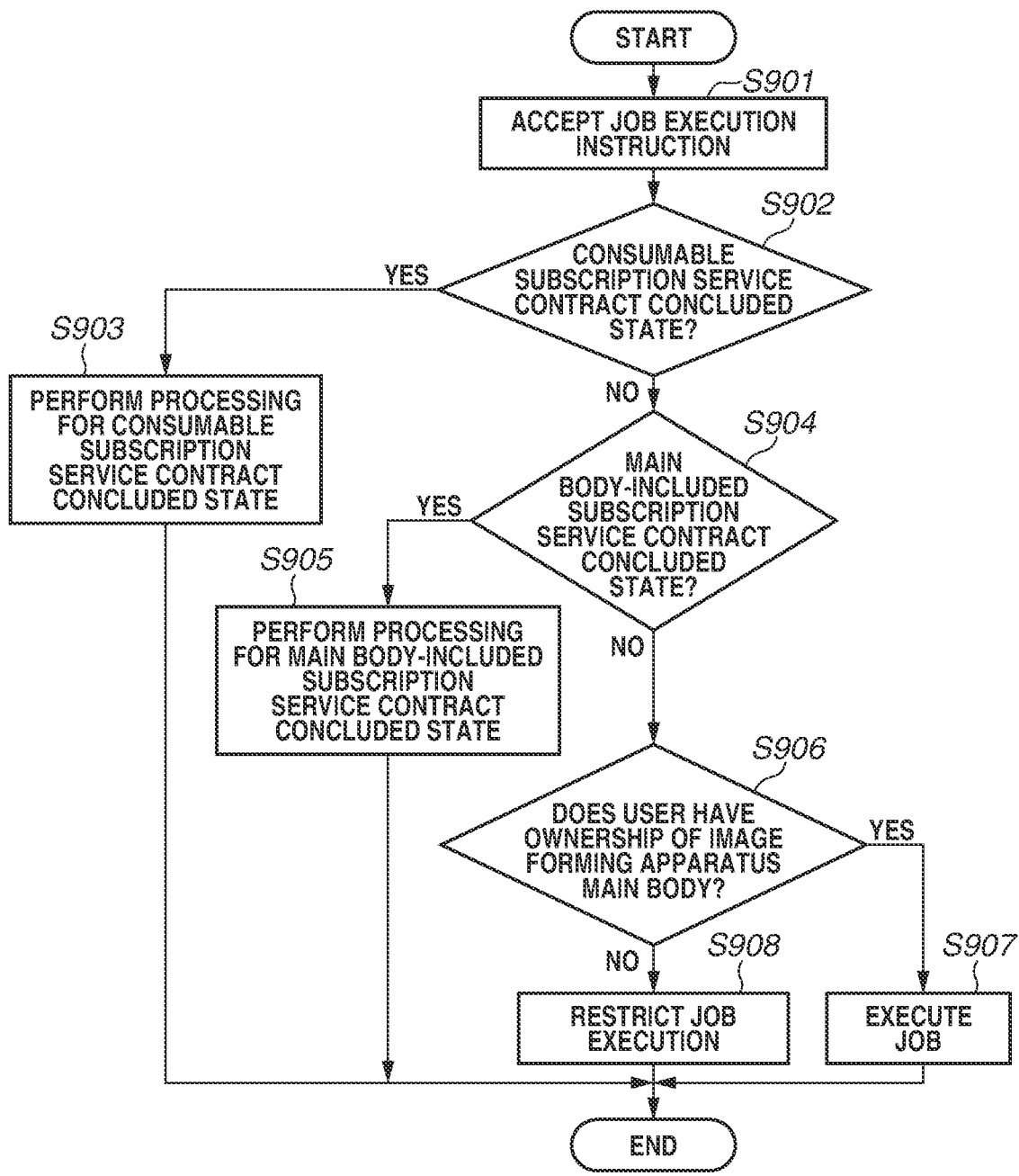
FIG. 9 is a flowchart of processing for job execution.

FIG. 9 is a flowchart where the image forming apparatus 200 performs job execution processing. Here, differences from the flowchart illustrated in FIG. 5 according to the first embodiment will mainly be described, and the redundant descriptions will be omitted.

In step S901, the image forming apparatus 200 accepts a job execution instruction from the user by using a given method.

In step S902, the image forming apparatus 200 determines whether the contract information stored in the contract information storage unit 332 indicates the consumable subscription service contract concluded state. In a case where, in step S902, the image forming apparatus 200 determines that the contract information indicates the consumable subscription service contract concluded state (YES in step S902), the processing proceeds to step S903. In a case where the image forming apparatus 200 determines that the contract information does not indicate the consumable subscription service contract concluded state (NO in step S902), the processing proceeds to step S904.

In step S903, the image forming apparatus 200 performs processing for the consumable subscription service contract concluded state to be described below with reference to FIG. 10.

In step S904, the image forming apparatus 200 determines whether the contract information stored in the contract information storage unit 332 indicates the main body-included subscription service contract concluded state. In a case where, in step S904, the image forming apparatus 200 determines that the contract information indicates the main body-included subscription service contract concluded state (YES in step S904), the processing proceeds to step S905. In a case where the image forming apparatus 200 determines that the contract information does not indicate the main body-included subscription service contract concluded state (NO in step S904), the processing proceeds to step S906.

In step S905, the image forming apparatus 200 performs processing for the main body-included subscription service contract concluded state to be described below with reference to FIG. 11.

In step S906, the image forming apparatus 200 refers to the ownership information stored in the data memory 330 and determines whether the user has the ownership of the image forming apparatus main body 300. In a case where, in step S906, the image forming apparatus 200 determines that the user has the ownership (YES in step S906), the processing proceeds to step S907. In a case where the image forming apparatus 200 determines that the user does not have the ownership (NO in step S906), the processing proceeds to step S908.

In step S907, the image forming apparatus 200 executes the received job. This processing is similar to that of step S506.

In step S908, the image forming apparatus 200 restricts execution of jobs involving printing (execution of a job using the subscription service-specific cartridge and execution of a job using the normal cartridge) and execution of jobs not involving printing. The image forming apparatus 200 can thus put restrictions on job execution on the image forming apparatus main body 300 of which ownership is on the service provider (i.e., the image forming apparatus main body 300 is the main body-included subscription service-specific apparatus) in the subscription service contract unconcluded state.

Figure 10:
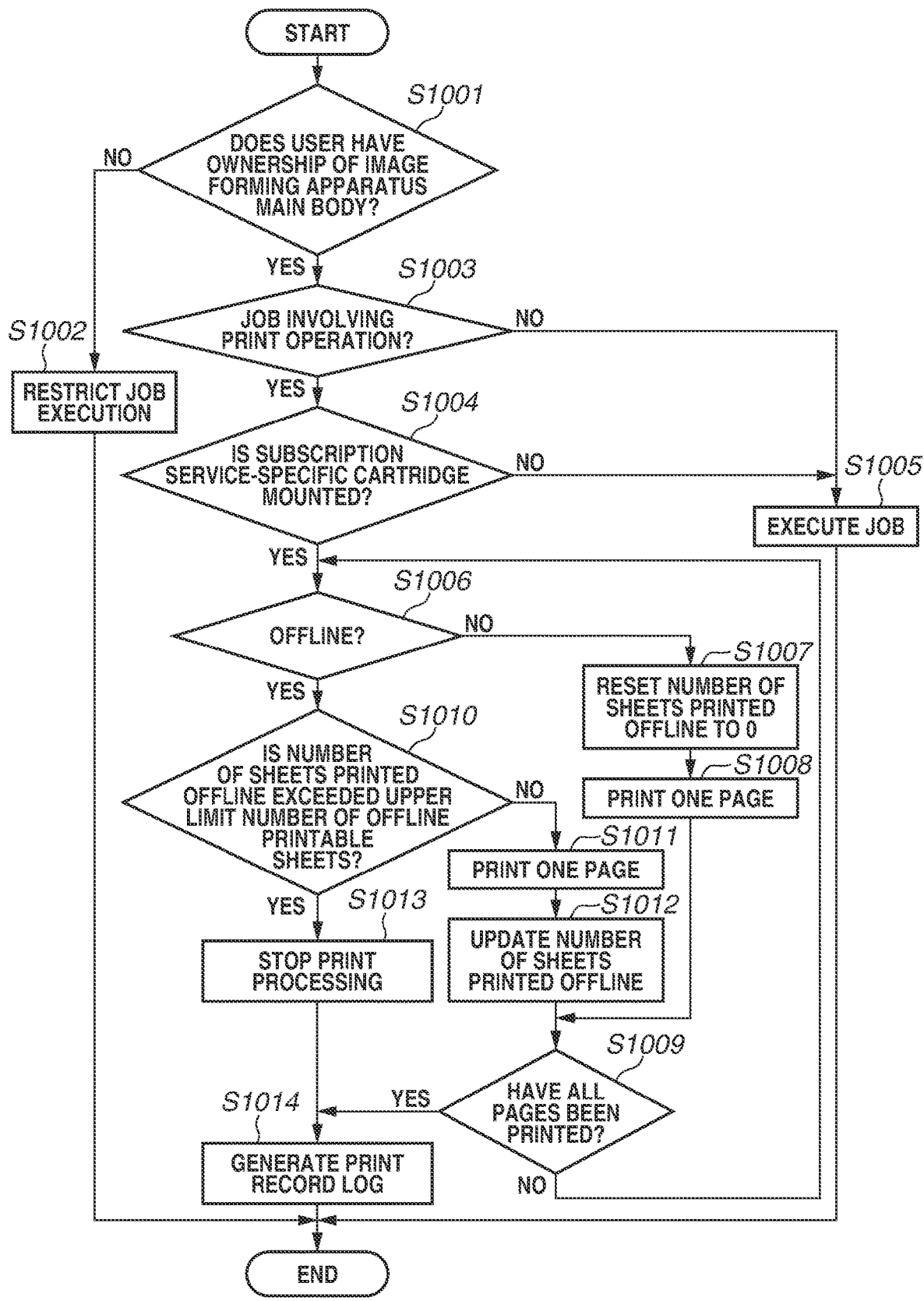
FIG. 10 is a flowchart of job execution processing in the consumable subscription service contract concluded state.

FIG. 10 is a flowchart related to the job execution in a case where the image forming apparatus 200 is in the consumable subscription service contract concluded state. Details of the processing in step S903 of FIG. 9 will be described with reference to FIG. 10. Here, differences from the flowchart illustrated in FIG. 6 according to the first embodiment will mainly be described, and the redundant descriptions will be omitted.

In step S1001, the image forming apparatus 200 refers to the ownership information stored in the data memory 330, and determines whether the user has the ownership of the image forming apparatus main body 300.

In a case where, in step S1001, the image forming apparatus 200 determines that the user does not have the ownership (NO in step S1001), the processing proceeds to step S1002. In a case where the image forming apparatus 200 determines that the user has the ownership (YES in step S1001), the processing proceeds to step S1003.

In step S1002, the image forming apparatus 200 restricts job execution. This processing corresponds to a case where the ownership information indicates that the service provider has the ownership, for some reason, despite the fact that the non consumable subscription service is a service using the image forming apparatus main body 300 of which ownership is on the user (i.e., purchased by the user).

The processing of steps S1003 to S1014 is similar to that of steps S601 to S612 in the flowchart of FIG. 6, and thus the redundant descriptions will be omitted.

Figure 11:
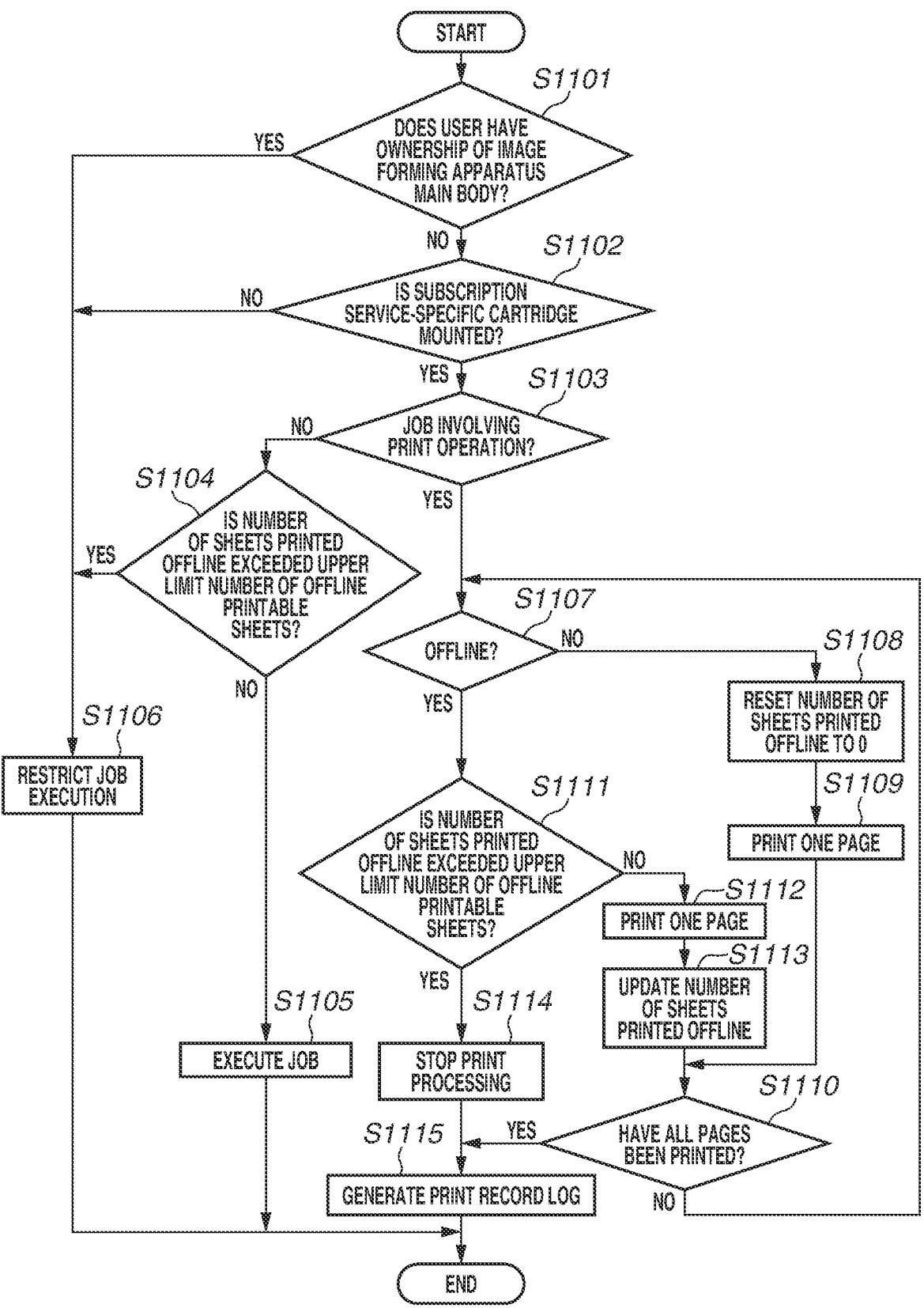
FIG. 11 is a flowchart of job execution processing in the main body-included subscription service contract concluded state.

FIG. 11 is a flowchart related to job execution in a case where the image forming apparatus 200 is in the main body-included subscription service contract concluded state. Details of the processing in step S905 of FIG. 9 will be described with reference to FIG. 11. Here, differences from the flowchart illustrated in FIG. 7 according to the first embodiment will mainly be described, and the redundant description will be omitted.

In step S1101, the image forming apparatus 200 refers to the ownership information stored in the data memory 330, and determines whether the user has the ownership of the image forming apparatus main body 300.

In a case where, in step S1101, the image forming apparatus 200 determines that the user has the ownership (YES in step S1101), the processing proceeds to step S1106. In a case where the image forming apparatus 200 determines that the user does not have the ownership (NO in step S1101), the processing proceeds to step S1102.

In step S1106, the image forming apparatus 200 restricts job execution. This processing corresponds to a case where the ownership information indicates that the user has the ownership, for some reason, despite the fact that the main body-included subscription service is a service using the image forming apparatus main body 300 of which ownership is on the service provider (i.e., lent by the service provider).

The processing of steps S1102 to S1115 is similar to that of steps S701 to S714 in the flowchart of FIG. 7, and thus the redundant descriptions will be omitted.

As described above, the image forming apparatus 200 stores the ownership information about the image forming apparatus main body 300, and performs a job execution determination appropriate for the service contract by using the ownership information and the service contract information. The image forming apparatus 200 can thus impose different job execution restrictions based on determination of which subscription service the image forming apparatus 200 is intended for, even in the subscription service contract unconcluded state.

OTHER EMBODIMENTS

In the foregoing embodiments of the present invention, the number of sheets printed offline is used to record the amount of printing performed offline by the image forming apparatus 200 using the subscription service-specific cartridge. However, any one or two or more of amounts of printing such as a printed area and the amount of ink discharged from the cartridge 400 can be used to determine the amount of printing performed offline using the subscription service-specific cartridge, aside from the number of sheets printed. In such a case, in step S205 of FIG. 2, the server 500 transmits the upper limit value(s) of offline printing for the corresponding amount(s) of printing (for example, the upper limit of offline printable area and the upper limit of offline dischargeable ink amount) to the image forming apparatus 200. In step S206, the image forming apparatus 200 then stores the received upper limit value(s) of printing in the data memory 330.

In the foregoing embodiments, the condition for determining that the image forming apparatus 200 does not achieve the service use condition is that the offline printed amount on the image forming apparatus 200 reaches the specified upper limit value.

However, any one or two or more of parameters, such as the number of times of offline job execution and the number of print record logs stored in the data memory 330 (number of logs to be transmitted to the server 500) can be used as the condition for determination of not achieving the service use condition, aside from the offline printed amount. In such a case, in step S205 of FIG. 2, the server 500 transmits the upper limit value(s) of the corresponding parameter(s) (such as the upper limit number of times of offline job execution and the upper limit number of stored print record logs) to the image forming apparatus 200. In step S206, the image forming apparatus 200 then stores the received upper limit value(s) in the data memory 330.

In a case where a predetermined time elapses without connection to the server 500, the image forming apparatus 200 can determine that the service use condition is not achieved, regardless of the offline printed amount or the offline state parameters.

In a case where the image forming apparatus 200 is offline, job execution can be restricted regardless of the parameters, such as the offline printed amount and the offline state parameters, to be used as the condition for determination of not achieving the service use condition. In other words, the processing of step S608 in FIG. 6 and steps S703 and S710 in FIG. 7 can be omitted.

The functions of the foregoing embodiments do not necessarily need to be implemented by a computer reading and executing program code. An OS running on the computer may perform part or all of the actual processing based on instructions of the program code, and the functions of the foregoing embodiments may be implemented by the processing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-086419, filed May 26, 2022, which is hereby incorporated by reference herein in its entirety.

What is claimed is:

1. A printing apparatus comprising:
   at least one memory which stores a computer program; and
   at least one processor which executes the computer program to
   manage information about a subscription service related to the printing apparatus;
   receive an instruction to execute processing of job data; and
   control the printing apparatus in a case where a contract of a first subscription service in which a user purchases the printing apparatus and a vendor provides a recording agent has been concluded, under a predetermined condition,
   not to execute the processing of the job data in which the provided recording agent is used, and
   to execute the processing of the job data in which the provided recording agent is not used, and
   in a case where a contract of a second subscription service in which a vendor provides both the printing apparatus and a recording agent has been concluded, under a predetermined condition,
   not to execute the processing of the job data in which the provided recording agent is used, and
   further not to execute the processing of the job data in which the provided recording agent is not used.

2. The printing apparatus according to claim 1, wherein the managed information about the subscription service is obtained from an information processing apparatus externally provided.

3. The printing apparatus according to claim 2, wherein the information processing apparatus externally provided is a server or a terminal apparatus.

4. The printing apparatus according to claim 2, wherein the printing apparatus is controlled
   in a case where the contract of the first subscription service has been concluded, under a condition as the predetermined condition that the printing apparatus does not communicate with the information processing apparatus,
   not to execute the processing of the job data in which the provided recording agent is used and
   to execute the processing of the job data in which the provided recording agent is not used, and
   in a case where the contract of the second subscription service has been concluded, under the condition as the predetermined condition that the printing apparatus does not communicate with the information processing apparatus,
   not to execute the processing of the job data in which the provided recording agent is used and
   further not to execute the processing of the job data in which the provided recording agent is not used.

5. The printing apparatus according to claim 2, wherein the printing apparatus is controlled
   in a case where the contract of the first subscription service has been concluded, under a condition as the predetermined condition that the printing apparatus does not communicate with the information processing apparatus and a number of print jobs executed while the printing apparatus does not communicate with the information processing apparatus exceeds a predetermined number,
   not to execute the processing of the job data in which the provided recording agent is used and
   to execute the processing of the job data in which the provided recording agent is not used, and
   in a case where the contract of the second subscription service has been concluded, under the condition as the predetermined condition that the printing apparatus does not communicate with the information processing apparatus and a number of print jobs executed while the printing apparatus does not communicate with the information processing apparatus exceeds a predetermined number,
   not to execute the processing of the job data in which the provided recording agent is used and
   further not to execute the processing of the job data in which the provided recording agent is not used.

6. The printing apparatus according to claim 2, wherein the printing apparatus is controlled
   in a case where the contract of the first subscription service has been concluded, under a condition as the predetermined condition that the printing apparatus does not communicate with the information processing apparatus and a predetermined time elapses without communicating with the information processing apparatus,
   not to execute the processing of the job data in which the provided recording agent is used and
   to execute the processing of the job data in which the provided recording agent is not used, and
   in a case where the contract of the second subscription service has been concluded, under the condition as the predetermined condition that a predetermined time elapses without communicating with the information processing apparatus,
   not to execute the processing of the job data in which the provided recording agent is used and
   further not to execute the processing of the job data in which the provided recording agent is not used.

7. The printing apparatus according to claim 2, wherein the printing apparatus is controlled
   in a case where the contract of the first subscription service has been concluded, under a condition as the predetermined condition that the printing apparatus does not communicate with the information processing apparatus and a number of sheets printed while the printing apparatus does not communicate with the information processing apparatus exceeds a predetermined number of sheets,
   not to execute the processing of the job data in which the provided recording agent is used and to execute the processing of the job data in which the provided recording agent is not used, and in a case where the contract of the second subscription service has been concluded, under the condition as the predetermined condition that the printing apparatus does not communicate with the information processing apparatus and a number of sheets printed while the printing apparatus does not communicate with the information processing apparatus, not to execute the processing of the job data in which the provided recording agent is used and further not to execute the processing of the job data in which the provided recording agent is not used.

8. The printing apparatus according to claim 2, wherein the first subscription service and the second subscription service are services in which an amount of printing is managed by the information processing apparatus communicated with the printing apparatus.

9. The printing apparatus according to claim 2, wherein
when the printing apparatus communicates with the information processing apparatus, in a case where the contract of the first subscription service has been concluded, the processing of the job data not involving the print operation is executed, and
when the printing apparatus communicates with the information processing apparatus, in a case where the contract of the second subscription service has been concluded, the processing of the job data not involving the print operation is executed.

10. The printing apparatus according to claim 2, wherein
when the printing apparatus communicates with the information processing apparatus, in a case where the contract of the first subscription service has been concluded and the processing of the job data involving the print operation is executed, and
when the printing apparatus communicates with the information processing apparatus, in a case where the contract of the second subscription service has been concluded the processing of the job data involving the print operation is executed.

11. The printing apparatus according to claim 2, wherein
when the printing apparatus communicates with the information processing apparatus, in a case the contract of the first subscription service has been concluded, the processing of the job data involving the print operation with a cartridge containing a recording agent other than the provided recording agent is mounted on the printing apparatus is executed, and
when the printing apparatus communicates with the information processing apparatus, in a case where the contract of the second subscription service has been concluded, the processing of the job data involving the print operation with the cartridge containing a recording agent other than the provided recording agent mounted on the printing apparatus is not executed.

12. The printing apparatus according to claim 1, wherein the printing apparatus is controlled
in a case where the contract of the first subscription service has been concluded, under a condition as the predetermined condition that a use condition of the subscription service is not achieved
not to execute the processing of the job data in which the provided recording agent is used and
to execute the processing of the job data in which the provided recording agent is not used, and
in a case where the contract of the second subscription service has been concluded, under the condition as the predetermined condition that a use condition of the subscription service is not achieved,
not to execute the processing of the job data in which the provided recording agent is used, and
further not to execute the processing of the job data in which the provided recording agent is not used.

13. The printing apparatus according to claim 1, wherein
in a case where the contract of the first subscription service has been concluded, under the predetermined condition,
as the processing of the job data in which the provided recording agent is not used, processing of a printing job with a cartridge containing a recording agent other than the provided recording agent is mounted on the printing apparatus is executed, and
in a case where the contract of the second subscription service has been concluded, under the predetermined condition,
as the processing of the job data in which the provided recording agent is not used, processing of a printing job with a cartridge containing a recording agent other than the provided recording agent mounted on the printing apparatus is not executed.

14. The printing apparatus according to claim 1, wherein
in a case where the contract of the first subscription service has been concluded, under the predetermined condition,
as the processing of the job data in which the provided recording agent is not used, processing of a scan job or a facsimile job is executed, and
in a case where the contract of the second subscription service has been concluded, under the predetermined condition,
as the processing of the job data in which the provided recording agent is not used, processing of a scan job or a facsimile job is not executed.

15. The printing apparatus according to claim 1, wherein
in a case where the contract of the first subscription service has been concluded and a use condition of the first subscription service is achieved, the processing of the job data is executed, and
in a case where the contract of the second subscription service has been concluded and a use condition of the second subscription service is achieved, the processing of the job data is executed.

16. The printing apparatus according to claim 15, wherein a the case where the use condition of the subscription service is achieved refers to a case where the printing apparatus communicates with an information processing apparatus externally provided and a number of sheets printed using a cartridge containing the provided recording agent does not exceed a predetermined number of sheets.

17. The printing apparatus according to claim 1, wherein
based on the first information, under the predetermined condition, as the execution of the job in which the provided recording agent is not used, execution of a job which is not a print job is not restricted, and
based on the second information, under the predetermined condition, as the execution of the job in which the provided recording agent is not used, execution of a job which is not a print job is restricted.

18. A method for controlling a printing apparatus, comprising:
managing information about a subscription service related to the printing apparatus;
executing processing of job data; and
controlling, in a case where a contract of a first subscription service in which a user purchases the printing apparatus and a vendor provides a recording agent has been concluded, under a predetermined condition, not to execute the processing of the job data in which the provided recording agent is used and to execute the processing of the job data in which the provided recording agent is not used, and in a case where a contract of a second subscription service in which a vendor provides both the printing apparatus and a recording agent has been concluded, under a predetermined condition, not to execute the processing of the job data in which the provided recording agent is used and further not to execute the processing of the job data in which the provided recording agent is not used.

19. A non-transitory computer readable storage medium storing a program for executing a method for controlling a printing apparatus, the method comprising:

managing information about a subscription service related to the printing apparatus;

executing processing of job data; and controlling, in a case where a contract of a first subscription service in which a user purchases the printing apparatus and a vendor provides a recording agent has been concluded, under a predetermined condition, not to execute the processing of the job data in which the provided recording agent is used and to execute the processing of the job data in which the provided recording agent is not used, and in a case where a contract of a second subscription service in which a vendor provides both the printing apparatus and a recording agent has been concluded, under a predetermined condition, not to execute the processing of the job data in which the provided recording agent is used and further not to execute the processing of the job data in which the provided recording agent is not used.

20. A printing apparatus comprising:

at least one memory which stores a computer program; and at least one processor which executes the computer program to:

manage information about a service related to the printing apparatus, wherein in a case where a first service in which a user purchases the printing apparatus and a vendor provides, at a flat rate, a recording agent has been concluded, first information about the first service is managed, and wherein in a case where a second service in which a vendor provides, at a flat rate, both the printing apparatus and a recording agent has been concluded, second information about the second service is managed;

receive an instruction to execute a job; and control the printing apparatus, based on the first information, under a predetermined condition, to restrict execution of the job in which the provided recording agent is used and not to restrict execution of the job in which the provided recording agent is not used.

\* \* \* \* \*